Aug. 13, 1929.                D. I. REITER                1,724,418
                           DOUBLE POINTED PIN
                          Filed April 17, 1929

INVENTOR
Daniel I. Reiter
BY
Harry Jacobson
ATTORNEY

Patented Aug. 13, 1929.

1,724,418

UNITED STATES PATENT OFFICE.

DANIEL I. REITER, OF NEW YORK, N. Y.

DOUBLE-POINTED PIN.

Application filed April 17, 1929. Serial No. 355,689.

This invention relates to pin fastener elements of the type intended to be passed through a piece of fabric such as the upholstery covering of an automobile, for the purpose of securing a slip cover in place.

In my previous application Serial No. 161,864, dated January 18th, 1927, I have shown such a pin fastener provided with a prong or spur integral with the head of the pin, which prong or spur resists the withdrawal of the pin from the material and otherwise maintains the pin against accidental displacement.

The present invention contemplates the provision of a similar pin provided with a similar spur which spur, however, is formed by twisting a portion of the head of the pin into interlocking engagement, at a point intermediate of the shanks of the pin, whereby a simple and effective spur is provided, adapted to be easily and economically manufactured in large quantities.

Figure 1:
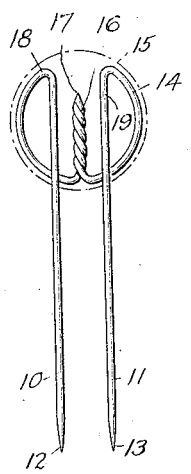

The various objects of my invention will be clear from the description which follows, and from the drawings, in which, Fig. 1 is a rear elevation of my improved pin, showing in dotted lines, the position which a cap held by the head of the pin may assume, which cap may be a socket or stud element of a snap fastener.

Figure 2:
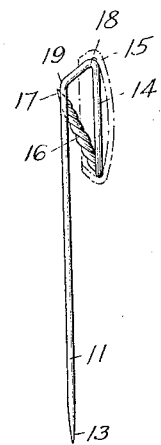

Fig. 2 is a side elevation of the same.

In that practical embodiment of my invention which I have illustrated by way of example, my improved pin fastener is preferably made of a single length of wire of the ordinary type used in such pins, and is preferably made symmetrical about a center line thereof. It will be understood, however, that the pin fastener may be made of two substantially identical parts, and that the spur above referred to may be formed by twisting the terminal ends of the heads of said parts into interlocking engagement.

The shanks 10 and 11 of the pin are preferably pointed at their lower ends 12 and 13 respectively, and at their upper ends, are bent to form the head 14. Said head 14 is more or less resilient and is adapted for quick and easy insertion into the cap 15, illustrated in dotted lines. The cap, due to the resiliency of the head, is therefore self-maintained in position. Said head 14 may be of any suitable shape, but as illustrated, is substantially circular in outline. Integral with the head 14 and preferably arranged between the shanks 10 and 11, is the prong or spur 16, which is formed by twisting together, adjacent portions of the length of wire forming the head 14 and pointing the uppermost point 17 of the twisted portion. The prong or spur 17, is preferably bent rearwardly of the head 14 to make an acute angle therewith as will be clear from Fig. 2. At the juncture of the shanks 10 and 11 with the head 14, a suitable bend as 18 is made and below said bend, the shanks 10 and 11 may again be bent as at 19 to bring said shanks rearwardly of and parallel and in spaced relation, to the head 14.

It will be understood that the cap 15 shown in diagrammatic form, and in dotted lines, may be a cap with a continuous imperforate outer surface, or may be provided with a suitable opening or socket for the reception of the stud element of any of the well known types of snap fasteners, or that said cap 15 may be provided with a stud such as is well known in the art, for entrance into the socket element of a snap fastener.

In operation, the shanks 10 and 11 are inserted into and through a piece of fabric until stopped by the bend 19, the point 17 at this time failing to pierce the fabric.

On any slight movement of the pin fastener, however, in the direction opposite to the direction of insertion, the point 17 pierces the fabric and prevents further movement of the pin in a direction which might be operative to withdraw the pin or otherwise displace it. Toward this end, the spur 16 is preferably bent rearwardly to a sufficient extent so that the point 17 is arranged slightly rearwardly of the shanks 10 and 11, as will be seen from Fig. 2.

It will be seen that I have provided a simple and efficient double pointed pin preferably made of a single length of wire, or if desired, made of two substantially identical pieces, identically shaped. In the former case, adjacent sections of the central portion of the length of wire are brought together, looped and afterwards twisted together and pointed, all of which can readily be accomplished by automatic machinery of known types economically and efficiently.

In the latter case, the prong or spur 16 is formed by twisting together the terminal portions of the identical pin sections and pointing the prong thus twisted. It will further be understood that while I have illustrated and described a preferred form of my invention, I do not wish to limit myself thereto but intend to claim my invention as broadly as may be permitted by the state of the prior art and the terms of the appended claims.

I claim:

1. In a double pointed pin, a pair of spaced shanks pointed at the lower ends thereof, a head integral with the upper ends of said shanks, continuous therewith, and spaced forwardly thereof, and a twisted spur arranged between said shanks, integral with the remainder of said head, and inclined rearwardly and upwardly therefrom.

2. In a double pointed pin, a pair of similar shanks, a head integral therewith and adapted to be inserted into a flanged cap, said head being sufficiently resilient for that purpose, and a twisted pointed spur integral with said head and extending rearwardly therefrom, in a direction opposite to the direction of said shanks.

3. In a double pointed pin, a pair of similar members adapted to pierce a piece of fabric, a head at the upper end of said members and extending therebetween, and a twisted spur extending upwardly and rearwardly from the lowermost part of said head.

4. A double pointed pin element including a wire bent to provide a resilient head at its intermediate portion, and bent to provide a pair of parallel pin portions, said portions lying in a plane substantially parallel to and offset from the plane of the head, and a spur element integral with and bent from the wire of the head, said spur element being twisted and pointed and adapted to engage a piece of fabric through which the pins have been inserted, to prevent withdrawal of the pin element.

5. A fastener element comprising a length of wire, bent to provide a member adapted to be inserted into a piece of fabric and a cap engaging member, and a twisted and pointed spur formed of said wire substantially halfway between the ends thereof.

6. In a pin fastener, a pin element and a spur element, both on the same length of wire, said spur element comprising interlocking twisted adjacent sections of said wire, said pin element and spur element being pointed at opposed ends.

7. A pin of a single length of wire having a head at one end thereof, a spur comprising adjacent sections integral with said head and twisted into interlocking engagement, said spur extending rearwardly and upwardly from the lowermost part of said head.

8. A pin of a single length of wire comprising a member adapted to be inserted into a piece of fabric, a head continuous with one end of said member, and a twisted spur integral with said head and extending rearwardly past said member.

9. In a one piece pin fastener, an integral spur comprising a section twisted and bent to outstand from said pin fastener, and pointed at the free upper end thereof.

10. In a pin fastener of a single length of wire, an integral spur twisted from substantially the central portion of said wire and pointed.

11. A double pointed pin comprising two identically shaped portions, each made of a length of wire and having a pointed shank and a substantially semi-circular head, said portions being arranged in opposed relation, and a prong on said pin at the juncture of said portions formed by twisting the adjacent ends of said portions together.

DANIEL I. REITER.